United States Patent
Hu et al.

(10) Patent No.: US 11,003,390 B2
(45) Date of Patent: May 11, 2021

(54) DATA STORAGE DEVICE WITH A LIGHTING MODULE AND CONTROL METHOD FOR THE LIGHTING MODULE

(71) Applicant: Silicon Motion, Inc., Jhubei (TW)

(72) Inventors: Ching-Hsin Hu, Taipei (TW); Tsai-Fa Liu, New Taipei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/560,059

(22) Filed: Sep. 4, 2019

(65) Prior Publication Data
US 2020/0201572 A1    Jun. 25, 2020

(30) Foreign Application Priority Data
Dec. 20, 2018   (TW) .................................. 107146196

(51) Int. Cl.
*G06F 3/06* (2006.01)
*G06F 13/42* (2006.01)

(52) U.S. Cl.
CPC ............ *G06F 3/0659* (2013.01); *G06F 3/061* (2013.01); *G06F 3/0679* (2013.01); *G06F 13/4282* (2013.01); *G06F 2213/0016* (2013.01)

(58) Field of Classification Search
CPC ....... G06F 12/1009; G06F 2009/45575; G06F 2009/45583; G06F 2009/45587; G06F 2212/152; G06F 8/656; G06F 9/4406; G06F 9/45558; G06F 13/4282; G06F 2213/0016; G06F 3/0605; G06F 3/061; G06F 3/0658; G06F 3/0659; G06F 3/0679

See application file for complete search history.

(56) References Cited

U.S. PATENT DOCUMENTS

| 8,410,904 | B2 | 4/2013 | Liu et al. |
| 2013/0238836 | A1* | 9/2013 | Suzuki ............... G11C 16/3495 711/103 |
| 2015/0169011 | A1 | 6/2015 | Bibl et al. |
| 2015/0342011 | A1 | 11/2015 | Brochu et al. |
| 2017/0352310 | A1 | 12/2017 | Kim et al. |
| 2018/0096593 | A1 | 4/2018 | Davis |

FOREIGN PATENT DOCUMENTS

| CN | 106557406 A | 4/2017 |
| CN | 106951354 A | 7/2017 |
| CN | 107222577 A | 9/2017 |
| CN | 107454703 A | 12/2017 |
| CN | 107484301 A | 12/2017 |

(Continued)

*Primary Examiner* — Yong J Choe
(74) *Attorney, Agent, or Firm* — McClure, Qualey & Rodack, LLP

(57) ABSTRACT

A data storage device is shown, which has a data storage module and a lighting module with the lighting module controlled by a host through the data storage module. The data storage module has a non-volatile memory and a controller that operates the non-volatile memory in response to the host. The lighting module has a lighting decoration. When the host outputs a command that carries the lighting request regarding the lighting decoration, the controller is switched to operate the lighting decoration to emit light according to the lighting request.

18 Claims, 4 Drawing Sheets

(56) References Cited

FOREIGN PATENT DOCUMENTS

| CN | 107835549 A | 3/2018 |
|----|-------------|--------|
| JP | 2010-243990 A | 10/2010 |
| TW | 201141314 A | 11/2011 |
| TW | 201638704 A | 11/2016 |
| TW | M531641 U | 11/2016 |
| TW | M569056 U | 10/2018 |
| TW | M569121 U | 10/2018 |

* cited by examiner

DATA STORAGE DEVICE WITH A LIGHTING MODULE AND CONTROL METHOD FOR THE LIGHTING MODULE

CROSS REFERENCE TO RELATED APPLICATIONS

This Application claims priority of Taiwan Patent Application No. 107146196, filed on Dec. 20, 2018, the entirety of which is incorporated by reference herein.

BACKGROUND OF THE INVENTION

Field of the Invention

The present invention relates to a data storage device with dynamic visual effects from lighting.

Description of the Related Art

With the development of technology, data storage devices are becoming more diverse. Many types of data storage devices can be used in computer equipment. In order to enrich the user's visual experience, the appearance of computer equipment is becoming more and more novel. The data storage device that comes equipped with it should also be so designed. A common visual design is achieved with lighting decorations (e.g., LEDs).

The emerging needs in the art include: lowering the cost to provide a data storage device equipped with lighting decoration without affecting the visual experience.

BRIEF SUMMARY OF THE INVENTION

In the disclosure, a data storage module is coupled to a lighting module to form a data storage device. A host system operates the lighting module through the data storage module. In the disclosure, no additional interface is required for communication between the host and the lighting module.

A data storage device in accordance with an exemplary embodiment of the disclosure includes a storage module and a lighting module. The data storage module has a non-volatile memory and a controller. The controller accesses the non-volatile memory in response to a host. The lighting module provides a lighting decoration and is operated by the host through the data storage module. When the host issues a command that carries a lighting request regarding the lighting decoration, the controller of the data storage module operates the lighting decoration of the lighting module to satisfy the lighting request.

In an exemplary embodiment, the command issued by the host to carry the lighting request is in a read format or a write format designed to access the non-volatile memory. An address field of the command is filled with a specific address, and another field in the command is filled with the lighting request. When recognizing the specific address, the controller determines that the command carries the lighting request.

In an exemplary embodiment, the data storage module and the lighting module communicate with each other through a serial interface. The lighting module further includes a microcontroller that operates the lighting decoration according to the lighting request transmitted to the lighting module through the serial interface. In an exemplary embodiment, the serial interface is an inter-chip bus I²C. In an exemplary embodiment, the different lighting modes are different regarding at least one of the following: blinking frequency, fade-out speed, fade-in speed, or color-change frequency. In an exemplary embodiment, the lighting decoration is an RGB color LED panel.

In an exemplary embodiment, the data storage module communicates with the lighting module through a general-purpose input and output pin (GPIO). In an exemplary embodiment, the lighting request carried by the command indicates a blinking frequency. The controller of the data storage module outputs high- and low-level at the general-purpose input and output pin according to the blinking frequency and thereby the lighting decoration blinks at the blinking frequency.

In an exemplary embodiment, the non-volatile memory of the data storage module is a flash memory. The host is coupled to the data storage module through a serial interface. The serial interface for communication between the host and the data storage module may be an advanced technology attachment (ATA) bus or a peripheral component interconnect express (PCIe) bus.

In an exemplary embodiment, a control method for a lighting module of a data storage device is disclosed, which includes the following steps: operating the lighting module according to a host, wherein the host operates the lighting module through a data storage module of a data storage device, and the data storage module has a non-volatile memory and a controller that accesses the non-volatile memory in response to the host; and when the host issues a command that carries a lighting request regarding a lighting decoration within the lighting module, the controller of the data storage module operates the lighting decoration of the lighting module to satisfy the lighting request.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device. The following discussion uses flash memory as an example.

Solid-state drive or solid-state disk (SSD) is a data storage device that uses flash memory as a permanent memory. SSD is widely used in computer equipment, such as being provided in a personal computer or for building a data center.

Figure 1:
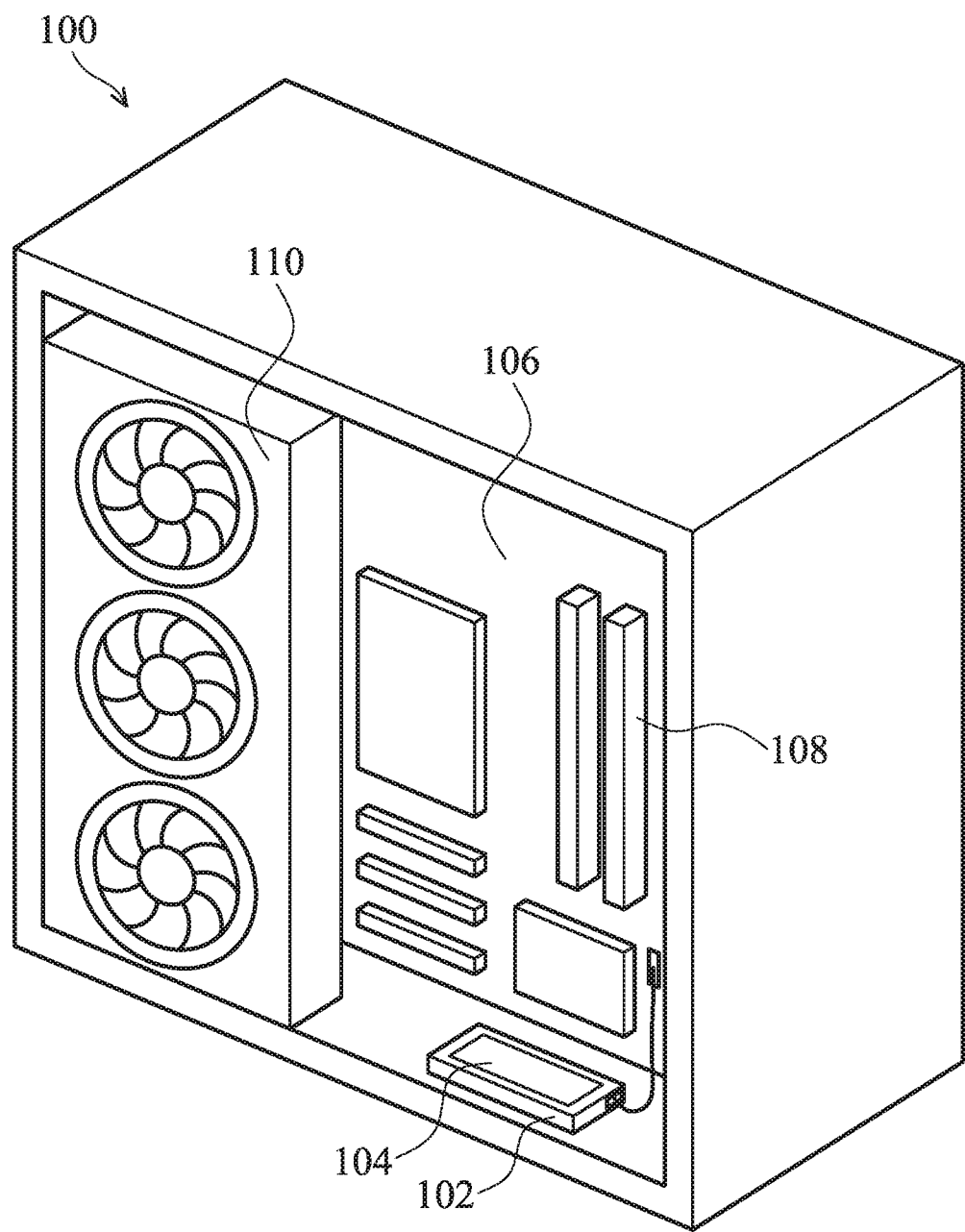
FIG. 1 uses a personal computer as an example to depict a computer device 100, which includes a solid state disk 102 that is implemented in accordance with an exemplary embodiment of the disclosure.

FIG. 1 uses a personal computer as an example to depict a computer device 100, which includes a solid state disk 102 that is implemented in accordance with an exemplary embodiment of the disclosure.

The solid state disk 102 includes a solid state disk module (an SSD module, inside the solid state disk 102 housing) and further includes a lighting module 104. The solid state disk 102 is coupled to a motherboard 106, and the computer device 100 is the host operating the solid state disk 102. The host accesses the storage within the SSD module of the solid state disk 102, and operates the lighting module 104 through the SSD module. Since the host does not communicate with the lighting module 104 through an additional interface, the product cost is considerably reduced.

Computer device 100 has a plurality of components as shown. Using an e-sports host as an example, the housing of the computer device 100 may be transparent. Various components of the computer device 100 may be installed with lighting decorations to enrich the user's visual experience. For example, the dynamic random access memory (DRAM) 108 installed in the slot of the motherboard 106 may have a light bar attached thereon, and the cooling fan 110 may also be decorated with light bars. The host may request all the lighting decorations on the computer device 100 to be synchronized (or separately operated according to a schedule) to blink, fade out, or gradually brightened. In some exemplary embodiments, the lighting decorations may be RGB color light-emitting diodes, emitting colorful light. The host may operate all the lighting decorations on the computer device 100 to change colors synchronously (or according to a schedule).

The SSD module within the solid state disk 102 of the present invention replaces an additional interface. The SSD module passes the host commands to the lighting module 104 and, accordingly, the lighting module 104 changes the light of the lighting decoration. The light changes may be synchronized with other lighting decorations on the computer device 100 (or controlled according to a schedule).

Figure 2:
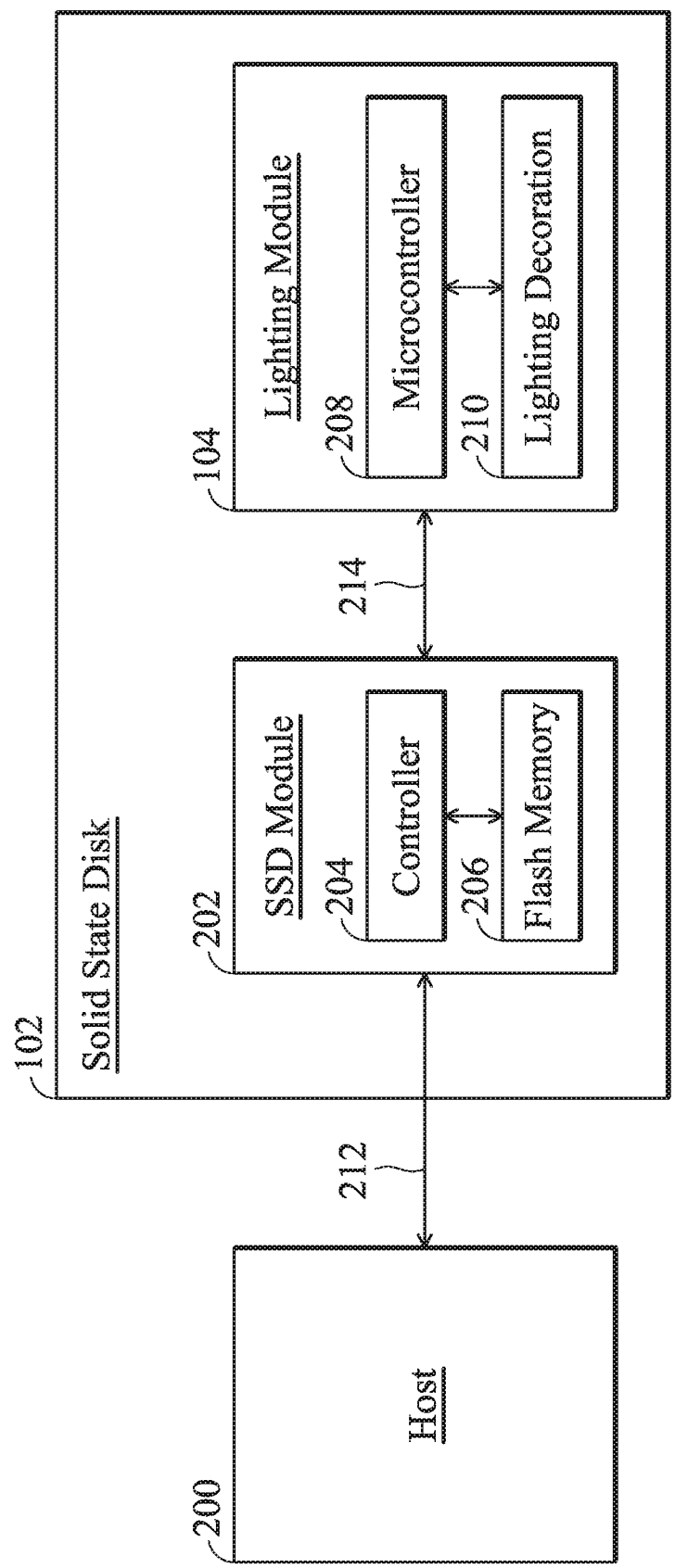
FIG. 2 is a block diagram depicting the solid state disk 102 in detail according to an exemplary embodiment of the present invention.

FIG. 2 is a block diagram depicting the solid state disk 102 in detail according to an exemplary embodiment of the present invention.

In FIG. 2, number 200 indicates the host operating the solid state disk 102, and number 202 indicates the SSD module within the solid state disk 102. The SSD module 202 includes a controller 204 and a flash memory 206. The lighting module 104 controlled by the host 200 through the SSD module 202 includes a microcontroller (MCU) 208 and a lighting decoration 210. The controller 204 is typically used to operate the flash memory 206. In the disclosure, the controller 204 is further in communication with the microcontroller 208 of the lighting module 104 to operate the lighting decoration 210.

The host 200 communicates with the SSD module 202 through a serial interface 212 for command transmission. For example, an advanced technology attachment (ATA) bus or a peripheral component interconnect express (PCIe) bus may be used for the communication between the host 200 and the SSD module 202. The SSD module 202 and the lighting module 104 may communicate with each other through a serial interface 214, such as an inter-chip bus ($I^2C$). The host 200 may use a command to issue a lighting request. The command is transmitted to the SSD module 202 through the serial interface 212, and is recognized by the controller 204, and then transmitted to the lighting module 104 through the serial interface 214. The microcontroller 208 in the lighting module 104, therefore, operates the lighting 210 to illuminate and satisfy the lighting request.

In an exemplary embodiment, the host 200 issues a lighting request by a command in a read or write command format. The read/write command format is originally designed to access the flash memory 202. In an exemplary embodiment, the host 200 may issue a read/write command to read/write data at a specific address or to call a set of commands which are arranged in a specific order. In other fields within the read/write command, the host 200 annotates the lighting request. The read/write command is transmitted to the SSD module 202 through the serial interface 212. The controller 204 recognizes the specific address indicated in the read/write command and determines that the read/write command is for the control of the lighting module 104, rather than really reads/writes the flash memory 206. The controller 204 passes the lighting request to the lighting module 104 via the serial interface 214. The microcontroller 208, therefore, operates the lighting decoration 210 to satisfy the lighting request. For example, the lighting decoration 210 blinks, dims, lights up or changes colors according to the lighting request.

In an exemplary embodiment, there are N lighting modes for the host 200 to select and fill in the read/write command as a lighting request. N is a number. The lighting mode requested in the read/write command is recognized by the microcontroller 208 of the lighting module 104 and, accordingly, the lighting decoration 210 operates. Each lighting mode may relate to blinking frequency, fade-in speed, fade-out speed, color-change frequency, or any combination of the above. Based on such a diverse mode setting, the lighting decoration 210 is not limited to a single color light bar. The lighting decoration 210 may be a 2.5-inch RGB light-emitting diode panel, or even other more complex lighting devices.

Figure 3:
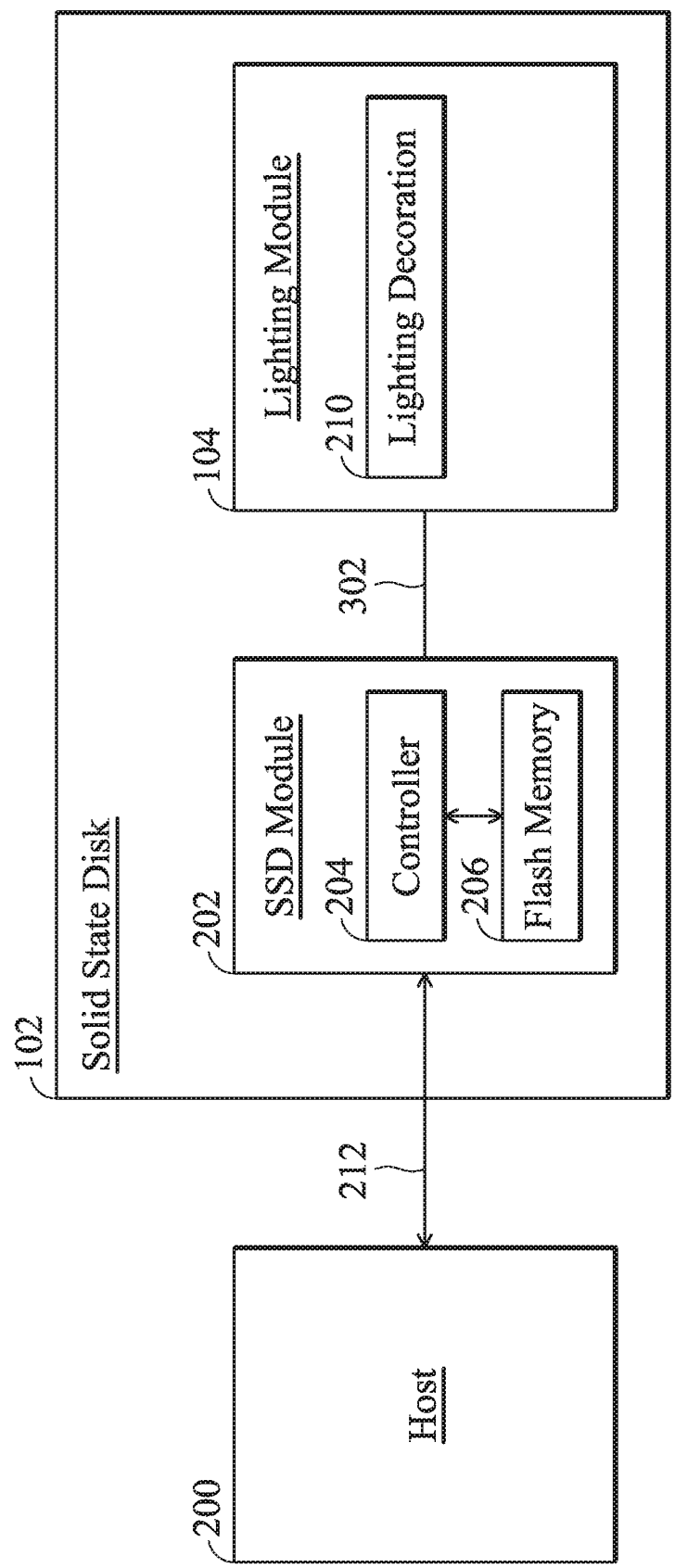
FIG. 3 is a block diagram depicting the solid state disk 102 in detail according to another exemplary embodiment of the present invention.

FIG. 3 is a block diagram depicting the solid state disk 102 in detail according to another exemplary embodiment of the present invention.

In FIG. 3, the SSD module 202 communicates with the lighting module 104 through a general-purpose input/output pin (GPIO) 302. The host 200 issues a read/write command to read/write data at a specific address or to call a set of commands which are arranged in a specific order. In other fields of the read/write command, the host 200 annotates the lighting request. The read/write command is transmitted to the SSD module 202 through the serial interface 212. The controller 204 recognizes the specific address indicated in the read/write command and determines that the read/write command is for the control of the lighting module 104, rather than really reads/writes the flash memory 206. The controller 204 extracts a blinking frequency requested in the read/write command and, accordingly, outputs high- or low-level signal at the GPIO pin 302 and thereby the lighting decoration 210 within the lighting module 104 blinks according to the blinking frequency specified by the host 200. Corresponding to such simple control ability, the lighting decoration 210 may be a monochrome light bar, or a 2.5-inch monochrome light-emitting diode panel, or other monochromatic lighting device. In this example, the lighting module 104 saves the cost of the microcontroller 208 shown in FIG. 2.

The solid state disk of the present invention is not limited to the type of the solid state disk 102 of FIG. 1. Other types of flash memory products may be equipped with a proper-sized lighting module 104 according to the aforementioned architecture.

Not limited to a flash memory, other types of non-volatile memory for implementing a data storage device may also involve the aforementioned technical concepts. Any technique that uses a non-volatile memory access controller to operate a lighting module without using an additional communication interface between the lighting module and the host relates to the present invention. A data storage device in accordance with an exemplary embodiment of the present invention includes a data storage module and a lighting module. The data storage module has a non-volatile memory and a controller for accessing the non-volatile memory according to host commands. The lighting module provides a lighting decoration and is coupled to the data storage module to be operated by host through the data storage module. When the host issues a command that carries a lighting request, the controller of the data storage module operates the lighting decoration within the lighting module to satisfy the lighting request.

The present invention further relates to a control method for a lighting module equipped to a data storage device. In an exemplary embodiment, the control method includes the following steps: operating the lighting module according to a host, wherein the host operates the lighting module through a data storage module of a data storage device, and the data storage module has a non-volatile memory and a controller that accesses the non-volatile memory in response to the host; and when the host issues a command that carries a lighting request regarding a lighting decoration within the lighting module, the controller of the data storage module operates the lighting decoration of the lighting module to satisfy the lighting request.

Figure 4:
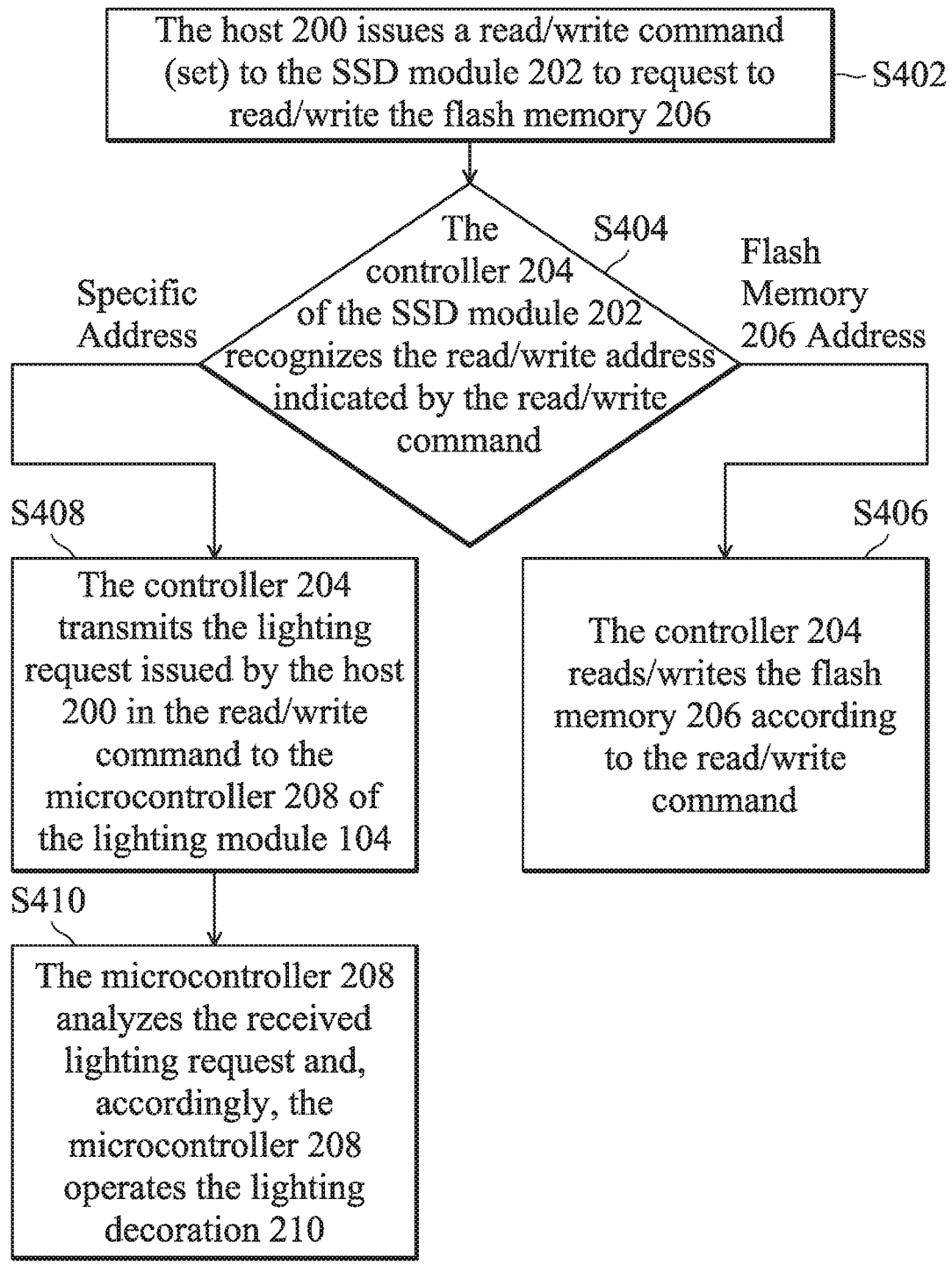
FIG. 4 is a flowchart depicting how the host 200 operates the solid state disk 102, which includes the control technique of the lighting module 104.

FIG. 4 is a flowchart depicting how the host 200 operates the solid state disk 102, which includes the control technique of the lighting module 104.

This paragraph is discussed based on the architecture of FIG. 2. In step S402, the host 200 issues a read/write command (set) to the SSD module 202 to request to read/write the flash memory 206. In step S404, the controller 204 of the SSD module 202 recognizes the read/write address indicated by the read/write command. When the read/write address really points to a space of the flash memory 206, the flow proceeds to step S406, and the controller 204 reads/writes the flash memory 206 according to the read/write command. When the read/write command is the specific address or relates to the specific set of commands, the process proceeds to step S408, and the controller 204 transmits the lighting request issued by the host 200 in the read/write command to the microcontroller 208 of the lighting module 104. In step S410, the microcontroller 208 analyzes the received lighting request and, accordingly, the microcontroller 208 operates the lighting decoration 210.

In FIG. 3, the communication between the SSD module 202 and the lighting module 104 is realized through the GPIO 302. For the example of FIG. 3, steps S408 and S410 of the flowchart of FIG. 4 are modified. According to the modified step S408, the controller 204 outputs high- or low-level signal (which changes at the blinking frequency indicated by the read/write command issued by the host 200) to be transferred through the GPIO 302. According to the modified step S410, the lighting decoration 210 is driven to blink according to the high- or low-level signal transferred through the GPIO 302. The blinking frequency follows that requested by the host 200.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a data storage module, having a non-volatile memory and a controller, wherein the controller accesses the non-volatile memory in response to a host; and
a lighting module with a lighting decoration, which is operated by the host through the data storage module, wherein:
when the host issues a command that carries a lighting request regarding the lighting decoration, the controller of the data storage module operates the lighting decoration of the lighting module to satisfy the lighting request;
the command issued by the host to carry the lighting request is in a read format or a write format designed to access the non-volatile memory;
an address field of the command is filled with a specific address, and another field in the command is filled with the lighting request; and
when recognizing the specific address, the controller determines that the command carries the lighting request.

2. The data storage device as claimed in claim 1, wherein:
the data storage module and the lighting module communicate with each other through a serial interface; and
the lighting module further includes a microcontroller that operates the lighting decoration according to the lighting request transmitted to the lighting module through the serial interface.

3. The data storage device as claimed in claim 2, wherein:
the serial interface is an inter-chip bus I2C.

4. The data storage device as claimed in claim 2, wherein:
the host selects one lighting mode from multiple lighting modes and arranges the command to indicate the selected lighting mode as the lighting request; and
the different lighting modes are different regarding at least one of a blinking frequency, a fade-out speed, a fade-in speed, or a color-change frequency.

5. The data storage device as claimed in claim 4, wherein:
the lighting decoration is an RGB color LED panel.

6. The data storage device as claimed in claim 1, wherein:
the data storage module communicates with the lighting module through a general-purpose input and output pin (GPIO).

7. The data storage device as claimed in claim 6, wherein:
the lighting request carried by the command indicates the blinking frequency; and
the controller of the data storage module outputs high-level or low-level signal at the general-purpose input and output pin according to the blinking frequency and thereby the lighting decoration blinks at the blinking frequency.

8. The data storage device as claimed in claim 1, wherein:
the non-volatile memory of the data storage module is a flash memory; and
the host is coupled to the data storage module through a serial interface.

9. The data storage device as claimed in claim 8, wherein:
the serial interface for communication between the host and the data storage module is an advanced technology attachment (ATA) bus or a peripheral component interconnect express (PCIe) bus.

10. A control method for a lighting module of a data storage device, comprising:
operating the lighting module according to a host, wherein the host operates the lighting module through a data storage module of a data storage device, and the data storage module has a non-volatile memory and a controller that accesses the non-volatile memory in response to the host; and
when the host issues a command that carries a lighting request regarding a lighting decoration within the lighting module, the controller of the data storage module operates the lighting decoration of the lighting module to satisfy the lighting request,
wherein:
the command issued by the host to carry the lighting request is in a read format or a write format designed to access the non-volatile memory;
an address field of the command is filled with a specific address, and another field in the command is filled with the lighting request; and
when recognizing the specific address, the controller determines that the command carries the lighting request.

11. The control method as claimed in claim 10, wherein:
the data storage module and the lighting module communicate with each other through a serial interface; and
the lighting module further includes a microcontroller that operates the lighting decoration according to the lighting request transmitted to the lighting module through the serial interface.

12. The control method as claimed in claim 11, wherein:
the serial interface is an inter-chip bus I2C.

13. The control method as claimed in claim 11, wherein:
the host selects one lighting mode from multiple lighting modes and uses the command to indicate the selected lighting mode as the lighting request; and
the different lighting modes are different regarding at least one of a blinking frequency, a fade-out speed, a fade-in speed, or a color-change frequency.

14. The control method as claimed in claim 13, wherein:
the lighting decoration is an RGB color LED panel.

15. The control method as claimed in claim 10, wherein:
the data storage module communicates with the lighting module through a general-purpose input and output pin (GPIO).

16. The control method as claimed in claim 15, wherein:
the lighting request carried by the command indicates a blinking frequency; and
the controller of the data storage module outputs high-level or low-level signal at the general-purpose input and output pin according to the blinking frequency and thereby the lighting decoration blinks at the blinking frequency.

17. The control method as claimed in claim 10, wherein:
the non-volatile memory of the data storage module is a flash memory; and
the host is coupled to the data storage module through a serial interface.

18. The control method as claimed in claim 17, wherein:
the serial interface for communication between the host and the data storage module is an advanced technology attachment (ATA) bus or a peripheral component interconnect express (PCIe) bus.

* * * * *